United States Patent
Kachi et al.

(10) Patent No.: US 12,253,038 B2
(45) Date of Patent: Mar. 18, 2025

(54) CONTROLLER FOR VEHICLE AND CONTROL METHOD FOR VEHICLE

(71) Applicant: TOYOTA JIDOSHA KABUSHIKI KAISHA, Aichi-ken (JP)

(72) Inventors: Masahiro Kachi, Nagakute (JP); Takehiro Komatsu, Toyota (JP); Masanao Idogawa, Nagoya (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 291 days.

(21) Appl. No.: 18/165,327

(22) Filed: Feb. 7, 2023

(65) Prior Publication Data
US 2023/0250770 A1    Aug. 10, 2023

(30) Foreign Application Priority Data
Feb. 10, 2022    (JP) .................................. 2022-019428

(51) Int. Cl.
| | |
|---|---|
| F02D 41/06 | (2006.01) |
| B60K 6/40 | (2007.10) |
| F02D 41/00 | (2006.01) |
| F02D 41/30 | (2006.01) |
| F02D 41/38 | (2006.01) |

(Continued)

(52) U.S. Cl.
CPC ............. *F02D 41/062* (2013.01); *B60K 6/40* (2013.01); *F02D 41/009* (2013.01); *F02D 41/3076* (2013.01); *F02D 41/38* (2013.01); *B60K 6/24* (2013.01); *B60K 6/26* (2013.01);
(Continued)

(58) Field of Classification Search
CPC .. F02D 41/062; F02D 41/009; F02D 41/3076; F02D 41/38; F02D 2200/92; B06K 6/40; B06K 6/24; B06K 6/26; B06K 6/387; B60W 10/06; B60W 20/40
See application file for complete search history.

(56) References Cited

U.S. PATENT DOCUMENTS

| | | | |
|---|---|---|---|
| 10,954,908 B2 * | 3/2021 | Verdier .................... | B60K 6/46 |
| 2009/0308674 A1 * | 12/2009 | Bhattarai .............. | B60W 10/06 |
| | | | 180/65.265 |

(Continued)

FOREIGN PATENT DOCUMENTS

| | | |
|---|---|---|
| JP | 201731913 A | 2/2017 |
| JP | 2017100626 A | 6/2017 |
| WO | 2010089857 A1 | 8/2010 |

*Primary Examiner* — George C Jin
(74) *Attorney, Agent, or Firm* — HAUPTMAN HAM, LLP (57) ABSTRACT

When a start request for an internal combustion engine is made with 1) a clutch disconnected, 2) a crankshaft rotating at a specified rotation speed or greater, and 3) fuel injection by an injector stopped, a controller for a vehicle executes: a first process that identifies, from the cylinders, a target cylinder that is in a compression stroke when the request is made; a second process that calculates a requested injection position based on the rotation speed; a third process that calculates, as a start crank position, a rotation position of the crankshaft advanced from the requested injection position by a specified rotation amount; and a fourth process that outputs a command signal that instructs a target injector to inject fuel at the crank position only if the rotation position of the crankshaft obtained when the request is made is advanced from the crank position.

4 Claims, 3 Drawing Sheets

(51) Int. Cl.
*B60K 6/24* (2007.10)
*B60K 6/26* (2007.10)
*B60K 6/387* (2007.10)

(52) U.S. Cl.
CPC ........... *B60K 6/387* (2013.01); *B60Y 2200/92* (2013.01); *F02D 2200/101* (2013.01)

(56) References Cited

U.S. PATENT DOCUMENTS

| | | | |
|---|---|---|---|
| 2014/0080663 A1* | 3/2014 | Nakanishi | B60W 10/02 180/65.265 |
| 2014/0249710 A1* | 9/2014 | Nakanishi | F02N 99/006 180/65.265 |
| 2015/0175155 A1* | 6/2015 | Nakanishi | B60W 10/06 180/65.265 |
| 2021/0062742 A1* | 3/2021 | Hotta | F02D 41/062 |
| 2023/0322205 A1* | 10/2023 | Kwak | B60W 10/06 |

\* cited by examiner

CONTROLLER FOR VEHICLE AND CONTROL METHOD FOR VEHICLE

RELATED APPLICATIONS

The present application claims priority of Japanese Patent Application No. 2022-019428 filed Feb. 10, 2022, the disclosure of which is hereby incorporated by reference herein in its entirety.

BACKGROUND

1. Field

The present disclosure relates to a controller for a vehicle and a control method for a vehicle.

2. Description of Related Art

Typical vehicles include an internal combustion engine, an electric motor, and a controller. The internal combustion engine includes a crankshaft coupled to the electric motor. The controller performs idle reduction control so as to stop and restart the internal combustion engine in accordance with a traveling condition of the vehicle. For example, during deceleration of the vehicle, the controller stops the internal combustion engine. If the controller stops the internal combustion engine during the deceleration of the vehicle and then the driver requests the vehicle to accelerate again, the controller restarts the internal combustion engine by using the electric motor to crank the internal combustion engine.

In the above case, in which the internal combustion engine is restarted during deceleration of the vehicle, the internal combustion engine may be restarted without cranking by the electric motor when the rotation speed of the crankshaft is greater than a certain rotation speed. In this case, fuel injection will need to be started at a proper time with the rotation position of the crankshaft taken into account.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A controller for a vehicle according to an aspect of the present disclosure is provided. The vehicle includes: an internal combustion engine that includes cylinders, injectors respectively disposed in the cylinders and each configured to directly inject fuel into a corresponding one of the cylinders, and a crankshaft; an electric motor located on a power transmission path from the internal combustion engine to a driven wheel, the electric motor including a rotary shaft; and a clutch located between the internal combustion engine and the electric motor, the clutch being configured to switch between a connected state in which the crankshaft and the rotary shaft are connected to each other and a disconnected state in which the crankshaft and the rotary shaft are disconnected from each other. The controller includes processing circuitry. The processing circuitry is configured to execute: when a start request for the internal combustion engine is made in a state in which 1) the clutch is in the disconnected state, 2) a rotation speed of the crankshaft is greater than or equal to a specified rotation speed that is greater than zero, and 3) fuel injection by the injector is stopped, a first process that identifies a target cylinder from the cylinders, the target cylinder referring to a cylinder that is in a compression stroke when the start request is made; a second process that calculates a requested injection position based on the rotation speed of the crankshaft, the requested injection position referring to a rotation position of the crankshaft at which fuel injection should be started by a target injector if fuel is burned in the target cylinder, and the target injector referring to an injector configured to inject fuel into the target cylinder; a third process that calculates, as a start crank position, the rotation position of the crankshaft that is advanced from the requested injection position by a specified rotation amount; and a fourth process that outputs a command signal that instructs the target injector to inject fuel at the start crank position only in a case in which the rotation position of the crankshaft obtained when the start request is made is advanced from the start crank position.

A control method for a vehicle according to an aspect of the present disclosure is provided. The vehicle includes: an internal combustion engine that includes cylinders, injectors respectively disposed in the cylinders and each configured to directly inject fuel into a corresponding one of the cylinders, and a crankshaft; an electric motor located on a power transmission path from the internal combustion engine to a driven wheel, the electric motor including a rotary shaft; and a clutch located between the internal combustion engine and the electric motor, the clutch being configured to switch between a connected state in which the crankshaft and the rotary shaft are connected to each other and a disconnected state in which the crankshaft and the rotary shaft are disconnected from each other. The control method comprises: when a start request for the internal combustion engine is made in a state in which 1) the clutch is in the disconnected state, 2) a rotation speed of the crankshaft is greater than or equal to a specified rotation speed that is greater than zero, and 3) fuel injection by the injector is stopped, identifying a target cylinder from the cylinders, the target cylinder referring to a cylinder that is in a compression stroke when the start request is made; calculating a requested injection position based on the rotation speed of the crankshaft, the requested injection position referring to a rotation position of the crankshaft at which fuel injection should be started by a target injector if fuel is burned in the target cylinder, and the target injector referring to an injector configured to inject fuel into the target cylinder; calculating, as a start crank position, the rotation position of the crankshaft that is advanced from the requested injection position by a specified rotation amount; and outputting a command signal that instructs the target injector to inject fuel at the start crank position only in a case in which the rotation position of the crankshaft obtained when the start request is made is advanced from the start crank position.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

A controller 100 for a vehicle 90 according to an embodiment will now be described with reference to the drawings.

Configuration of Vehicle

Figure 1:
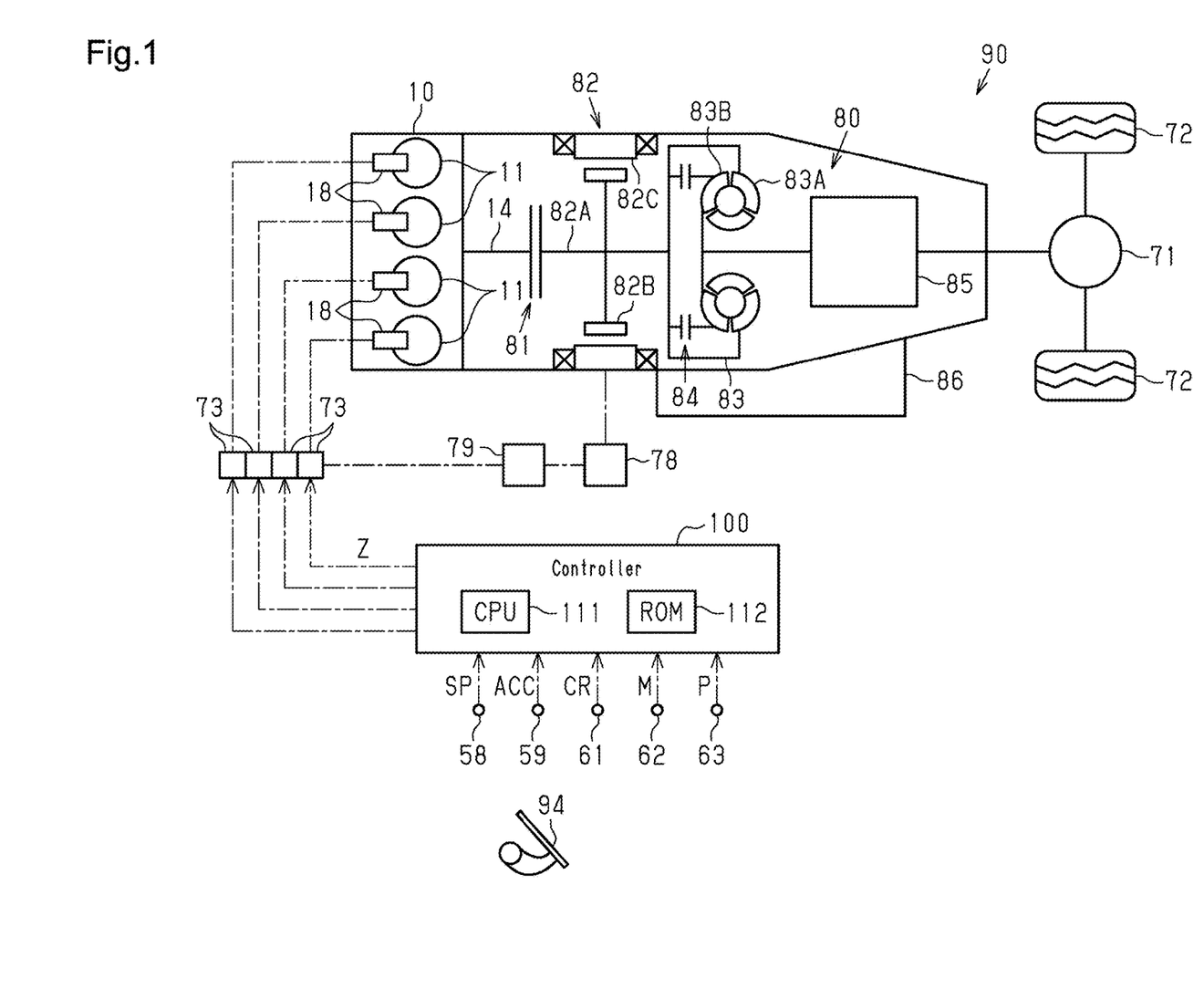
FIG. 1 is a schematic diagram showing the configuration of a vehicle.

As shown in FIG. 1, the vehicle 90 includes an internal combustion engine 10, a clutch 81, a motor generator 82, a shifting unit 80, and a hydraulic mechanism 86. The vehicle 90 further includes a differential 71, driven wheels 72, an inverter 78, and a battery 79.

The internal combustion engine 10 is a driving force of the vehicle 90. The configuration of the internal combustion engine 10 will be described in detail later. The internal combustion engine 10 includes a crankshaft 14.

The motor generator 82 is a driving force of the vehicle 90. The motor generator 82 functions as an electric motor and a generator. The motor generator 82 includes a stator 82C, a rotor 82B, and a rotary shaft 82A. The rotor 82B is rotatable relative to the stator 82C. The rotary shaft 82A rotates integrally with the rotor 82B. The motor generator 82 is electrically connected to the battery 79 via the inverter 78. The battery 79 transfers power to and from the motor generator 82. The inverter 78 converts DC to AC.

The clutch 81 is located between the internal combustion engine 10 and the motor generator 82. The clutch 81 is operated by hydraulic pressure from the hydraulic mechanism 86 so as to switch between a connected state and a disconnected state. When supplied with hydraulic pressure, the clutch 81 enters the connected state, in which the crankshaft 14 and the rotary shaft 82A of the motor generator 82 are connected to each other. When the supply of hydraulic pressure is stopped, the clutch 81 enters the disconnected state, in which the crankshaft 14 and the rotary shaft 82A of the motor generator 82 are disconnected from each other.

The shifting unit 80 includes a torque converter 83 and an automatic transmission 85. The torque converter 83 includes a pump impeller 83A, a turbine liner 83B, and a lockup clutch 84. The torque converter 83 is a fluid coupling that functions to amplify torque. The pump impeller 83A rotates integrally with the rotary shaft 82A of the motor generator 82. The turbine liner 83B rotates integrally with an input shaft of the automatic transmission 85. When supplied with hydraulic pressure from the hydraulic mechanism 86, the lockup clutch 84 directly couples the pump impeller 83A to the turbine liner 83B.

The automatic transmission 85 is a multi-speed automatic transmission that switches the gear ratio in multiple stages by switching gears. The automatic transmission 85 includes an output shaft connected to the left and right driven wheels 72 via the differential 71. The differential 71 allows the rotation speeds of the left and right driven wheels 72 to differ from each other. The clutch 81, the motor generator 82, and the shifting unit 80 are accommodated in a single case. That is, the clutch 81, the motor generator 82, and the shifting unit 80 form an integrated hybrid transaxle. The clutch 81, the motor generator 82, and the shifting unit 80 are located on a power transmission path from the internal combustion engine 10 to the driven wheels 72.

The vehicle 90 includes an accelerator pedal 94. The accelerator pedal 94 is a foot pedal depressed by a driver. The vehicle 90 includes a vehicle speed sensor 58 and an accelerator sensor 59. The vehicle speed sensor 58 detects a traveling speed SP of the vehicle 90. The vehicle speed sensor 58 outputs a signal corresponding to the detected traveling speed SP. The accelerator sensor 59 detects an accelerator operation amount ACC, which is the depression amount of the accelerator pedal 94. The accelerator sensor 59 outputs a signal corresponding to the detected accelerator operation amount ACC.

Details of Internal Combustion Engine

Figure 2:
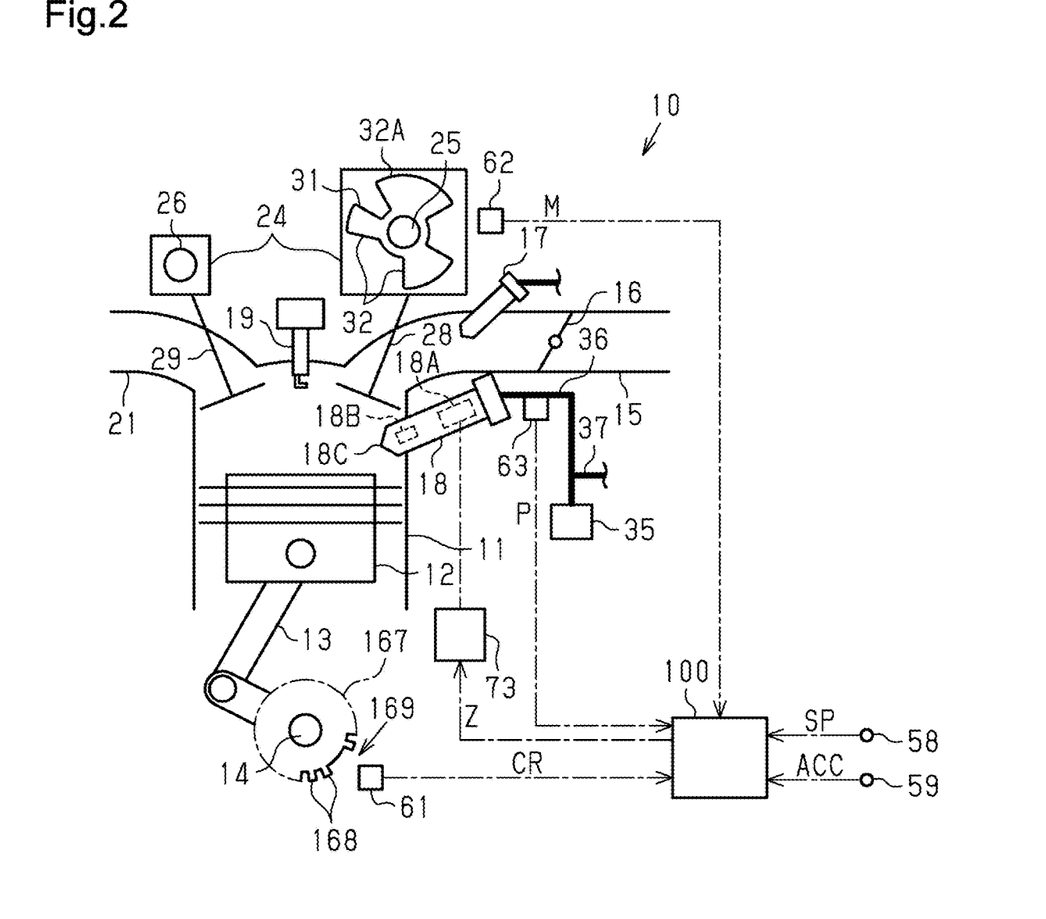
FIG. 2 is a schematic diagram showing the configuration of the internal combustion engine shown in FIG. 1.

As shown in FIGS. 1 and 2, the internal combustion engine 10 includes four cylinders 11, four pistons 12, and four connecting rods 13, and the crankshaft 14. FIG. 2 shows only one of the four cylinders 11. The same applies to the pistons 12 and the connecting rods 13. Each piston 12 and each connecting rod 13 is disposed in a corresponding cylinder 11. Hereinafter, the four cylinders 11 are referred to as the cylinder(s) 11 when collectively described. When distinguished from each other, the four cylinders 11 are referred to as a first cylinder #1, a second cylinder #2, a third cylinder #3, and a fourth cylinder #4.

Each cylinder 11 defines a space for burning fuel. As shown in FIG. 2, the piston 12 is located in the cylinder 11. The piston 12 reciprocates in the cylinder 11. The piston 12 is coupled to the crankshaft 14 by the connecting rod 13. The crankshaft 14 rotates as the piston 12 reciprocates. The internal combustion engine 10 is a four-stroke cycle engine in which the intake stroke, the compression stroke, the expansion stroke, and the expansion stroke of the cylinder 11 are completed when the crankshaft 14 rotates by 720°.

The internal combustion engine 10 includes four ignition plugs 19. FIG. 2 shows only one of the four ignition plugs 19. Each ignition plug 19 is disposed in a corresponding cylinder 11. The tip of the ignition plug 19 is located in the cylinder 11. The ignition plug 19 ignites the air-fuel mixture of intake air and fuel. In the present embodiment, the four ignition plugs 19 perform ignition in the order of the first cylinder #1, the third cylinder #3, the fourth cylinder #4, and the second cylinder #2. In other words, the four cylinders 11 enter the expansion stroke accompanied by the combustion of air-fuel mixture in the order of the first cylinder #1, the third cylinder #3, the fourth cylinder #4, and the second cylinder #2.

As shown in FIGS. 1 and 2, the internal combustion engine 10 includes four direct injectors 18. FIG. 2 shows only one of the four direct injectors 18. As shown in FIG. 1, each direct injector 18 is disposed in a corresponding cylinder 11. As shown in FIG. 2, the direct injector 18 directly injects fuel into the cylinder 11 without going through an intake passage 15, which will be described later. The direct injector 18 includes an electromagnetic solenoid 18A, a valve member 18B, and an injection hole 18C. The injection hole 18C is located at the tip of the direct injector 18. The tip of the direct injector 18, including the injection hole 18C, is located in the cylinder 11. The position of the valve member 18B changes depending on whether the electromagnetic solenoid 18A is powered on or off. In a state in which the electromagnetic solenoid 18A is powered off, the valve member 18B is located at an initial position at which the valve member 18B closes the injection hole 18C. In this case, the direct injector 18 does not inject fuel. When the electromagnetic solenoid 18A is powered on, the valve member 18B moves to an ignition position at which the injection hole 18C opens. When the valve member 18B is located at the injection position, the direct injector 18 injects fuel into the cylinder 11 through the injection hole 18C.

As shown in FIGS. 1 and 2, the internal combustion engine 10 includes four drive circuits 73. FIG. 2 shows only one of the four drive circuits 73. Each drive circuit 73 is arranged to correspond with a direct injector 18. The drive circuit 73 is located between each direct injector 18 and the battery 79. The drive circuit 73 is an electric circuit including a switch and the like. The drive circuit 73 is operated in accordance with a command signal Z, which will be described later. This operation causes the drive circuit 73 to power on and off the electromagnetic solenoid 18A of the direct injector 18.

Referring to FIG. 2, the internal combustion engine 10 includes the intake passage 15, a throttle valve 16, four port injectors 17, and an exhaust passage 21. FIG. 2 shows only one of the four port injectors 17. The intake passage 15 is a passage through which intake air is drawn into each cylinder 11. The intake passage 15 is connected to the cylinders 11. The throttle valve 16 is located in the intake passage 15. The throttle valve 16 regulates the amount of intake air flowing through the intake passage 15. The four port injectors 17 are located in the intake passage 15 on the downstream side of the throttle valve 16. Each port injector 17 is disposed in a corresponding cylinder 11. The port injector 17 injects fuel into the intake passage 15. In FIG. 2, the port injector 17 has a smaller size than the direct injector 18 for illustrative purposes. The exhaust passage 21 is a passage through which exhaust gas is discharged from the cylinders 11. The exhaust passage 21 is connected to the cylinders 11.

The internal combustion engine 10 includes a fuel supply system. The fuel supply system includes a fuel tank 35, a fuel supply passage 36, a branch passage 37, and a fuel pressure sensor 63. The fuel tank 35 stores fuel. The fuel supply passage 36 connects the fuel tank 35 to the direct injectors 18. Fuel that is forced to flow by a pump (not shown) flows through the fuel supply passage 36. The fuel pressure sensor 63 detects a pressure P of fuel supplied to the direct injector 18. The pressure P of the fuel is hereinafter referred to as the fuel pressure P. The fuel pressure sensor 63 outputs a signal corresponding to the detected fuel pressure P. The branch passage 37 branches from the fuel supply passage 36. The branch passage 37 is connected to the port injectors 17.

The internal combustion engine 10 includes an intake valve 28, an exhaust valve 29, and a valvetrain 24. The valvetrain 24 includes an intake camshaft 25 and an exhaust camshaft 26. The intake camshaft 25 and the exhaust camshaft 26 are coupled to the crankshaft 14 by a timing chain (not shown). The intake camshaft 25 and the exhaust camshaft 26 are operated in synchronization with the crankshaft 14. When the crankshaft 14 rotates twice, the intake camshaft 25 and the exhaust camshaft 26 each rotate once. The intake valve 28 is operated in synchronization with the intake camshaft 25. This operation causes the intake valve 28 to open and close ports of the intake passage 15 that are connected to the cylinders 11. The exhaust valve 29 is operated in synchronization with the exhaust camshaft 26. This operation causes the exhaust valve 29 to open and close ports of the exhaust passage 21 that are connected to the cylinders 11.

The internal combustion engine 10 includes a sensor plate 167 and a crank position sensor 61. The sensor plate 167 includes a disk-shaped body and teeth 168 that protrude from the outer circumference of the body. The body rotates integrally with the crankshaft 14. The teeth 168 are basically arranged at intervals of 10°. There is a section where the interval between the teeth 168 adjacent to each other is 30°. This section, which has a larger interval between adjacent ones of the teeth 168 than the other sections of the outer circumference of the body, is referred to as a tooth-missing portion 169.

The crank position sensor 61 is located at a position facing the outer circumference of the sensor plate 167. As the crankshaft 14 rotates, the sensor plate 167 rotates. This causes the crank position sensor 61 to alternately face a tooth 168 of the sensor plate 167 and the gap between adjacent ones of the teeth 168. The crank position sensor 61 outputs an L signal when facing a tooth 168 of the sensor plate 167 and outputs an H signal when facing the gap. Basically, the crank position sensor 61 alternately outputs the L signal and the H signal at a fixed normal interval in correspondence with the arrangement of the teeth 168. Only when the tooth-missing portion 169 passes by the crank position sensor 61, the crank position sensor 61 outputs the H signal at an interval that is longer than the normal interval. The H signal output by the crank position sensor 61 when the tooth-missing portion 169 passes by the crank position sensor 61 is hereinafter referred to as a tooth-missing signal. Further, the signal output by the crank position sensor 61 is hereinafter collectively referred to as a crank signal CR.

In view of the order of the cylinders 11 that enter the expansion stroke, the piston 12 of the first cylinder #1 and the piston 12 of the fourth cylinder #4 are located at top dead center at the same time. In the present embodiment, the position of the tooth-missing portion 169 is defined such that the crank position sensor 61 faces the end of the tooth-missing portion 169 of the sensor plate 167 in its rotation direction when the piston 12 of the first cylinder #1 and the piston 12 of the fourth cylinder #4 are located at top dead center. This setting causes the crank signal CR to be switched from the tooth-missing signal to the L signal before and after the piston 12 of the first cylinder #1 and the piston 12 of the fourth cylinder #4 each reach top dead center.

The internal combustion engine 10 includes a first rotor plate 31 and a first cam position sensor 62. The first rotor plate 31 includes an annular body and three sectoral protrusions 32 that protrude from the outer circumference of the body. The body rotates integrally with the intake camshaft 25. The three protrusions 32 protrude in intervals in the direction corresponding to the outer circumference of the body, each of the three protrusions 32 disposed in a different occupied range. The intervals of adjacent ones of the protrusions 32 are different from each other.

The first cam position sensor 62 is located at a position facing the outer circumference of the first rotor plate 31. As the intake camshaft 25 rotates, the first rotor plate 31 rotates. This causes the first cam position sensor 62 to alternately face a protrusion 32 of the first rotor plate 31 and the gap between adjacent ones of the protrusions 32. The first cam position sensor 62 outputs the L signal when facing each protrusion 32 and outputs the H signal when facing the gap. The interval between the L signal and the H signal output by the first cam position sensor 62 varies depending on the occupied range of each of the three protrusions 32 of the first rotor plate 31. When a large protrusion 32A, which has the largest occupied range, passes by the first cam position sensor 62, the first cam position sensor 62 outputs the L signal at an interval that is longer than the intervals when the other protrusions 32 pass. The L signal output by the first cam position sensor 62 when the large protrusion 32A passes by first cam position sensor 62 is hereinafter referred to as the longest signal. Further, the signal output by the first cam position sensor 62 is hereinafter collectively referred to as a cam signal M.

In the present embodiment, the position of the large protrusion 32A of the first rotor plate 31 is defined as follows. When the piston 12 of the first cylinder #1 is located at the compression top dead center, the end of the large protrusion 32A in its rotation direction faces the first cam position sensor 62. This setting causes the cam signal M to be switched from the longest signal to the H signal before and after the piston 12 of the first cylinder #1 reaches the compression top dead center. As described above, when the crankshaft 14 rotates twice, the intake camshaft 25 rotates once. Thus, the position of the outer circumference of the first rotor plate 31 facing the first cam position sensor 62 when the piston 12 of the first cylinder #1 is located at the compression top dead center is different from that position when the piston 12 of the fourth cylinder #4 is located at the compression top dead center. Accordingly, when the cam signal M is switched from the longest signal to the H signal, the piston 12 of the fourth cylinder #4 is not located at the compression top dead center.

The internal combustion engine 10 includes a second rotor plate and a second cam position sensor, which are not shown in the drawings. The second rotor plate and the second cam position sensor are used to detect changes in the rotation of the exhaust camshaft 26. The configurations of the second rotor plate and the second cam position sensor are the same as those of the first rotor plate 31 and the first cam position sensor 62 except they are used for the exhaust camshaft 26, and thus will not be described.

Controller

As shown in FIG. 1, the vehicle 90 includes a controller 100. The controller 100 may include circuitry including one or more processors that execute various processes in accordance with a computer program (software). The controller 100 may include circuitry that includes one or more dedicated hardware circuits such as application specific integrated circuits (ASICs) that execute at least part of various processes or includes a combination of one or more processors and one or more dedicated hardware circuits. The processor includes a CPU 111 and memories, such as a RAM and a ROM 112. Each memory stores program codes or instructions configured to cause the CPU 111 to execute the processes. The memory, or a computer-readable medium, includes any type of media that are accessible by general-purpose computers and dedicated computers. The controller 100 includes a storage device that is an electrically-rewriteable nonvolatile memory.

The controller 100 repeatedly receives signals output by the various sensors of the vehicle 90. Based on the received signals, the controller 100 controls various sections of the vehicle 90. As part of the control, the controller 100 controls the internal combustion engine 10. The controller 100 calculates an engine rotation speed NE, which is a rotation speed of the crankshaft 14, based on changes in the crank signal CR as a basic process for controlling the internal combustion engine 10. The controller 100 repeatedly calculates the engine rotation speed NE. Based on the changes in the crank signal CR, the controller 100 calculates a crank position that is the rotation position of the crankshaft 14 (specifically, calculates a crank counter value indicating the crank position). For example, the controller 100 specifies a reference crank position based on the time at which the crank signal CR is switched from the tooth-missing signal to the L signal when the engine rotation speed NE becomes 0 and then becomes greater than 0 again. From the reference crank position, the controller 100 counts up the crank position from 0° in correspondence with the changes in the crank signal CR. When the crank position becomes 720°, the controller 100 recalculates the crank position from 0°. That is, the controller 100 calculates the crank position using one cycle of the internal combustion engine 10 as a single cycle. With reference to the crank position, the controller 100 performs various types of control on the internal combustion engine 10. For example, to control fuel injection, the controller 100 outputs the command signal Z to instruct the direct injector 18 to inject fuel at a proper time that can be obtained from the crank position. Outputting the command signal Z to the direct injector 18 is substantially equivalent to outputting the command signal Z to the drive circuit 73 that corresponds to the direct injector 18.

As described above, the controller 100 specifies the reference crank position to calculate the crank position. To calculate the crank position, the controller 100 takes the phases of the cylinders 11 into account. That is, the controller 100 specifies the reference crank position by recognizing in which of the intake stroke, the compression stroke, the expansion stroke, and the exhaust stroke each cylinder 11 is involved. To obtain the phase of each cylinder 11, the controller 100 refers to the changes in the crank signal CR and changes in the cam signal M. As described above, the crank signal CR is switched from the tooth-missing signal to the L signal before and after the piston 12 of the first cylinder #1 and the piston 12 of the fourth cylinder #4 each reach top dead center. Further, the cam signal M is switched from the longest signal to the H signal before and after the piston 12 of the first cylinder #1 reaches the compression top dead center. Thus, in a case in which the cam signal M is switched from the longest signal to the H signal when the crank signal CR is switched from the tooth-missing signal to the L signal, the controller 100 recognizes that the piston 12 of the first cylinder #1 is located at the compression top dead center and the piston 12 of the fourth cylinder #4 is located at the exhaust top dead center. Based on such information related to the phases of the cylinders 11, the controller 100 specifies the reference crank position. Then, the controller 100 calculates the crank position in association with the phase of each cylinder 11. Accordingly, the controller 100 constantly identifies the current phase of each cylinder 11.

Switching of Traveling Mode

The controller 100 switches the traveling mode of the vehicle 90 to a first mode or a second mode depending on a condition. In the first mode, the controller 100 causes the internal combustion engine 10 to stop running and sets the clutch 81 to the disconnected state. In this case, the controller 100 causes the vehicle 90 to travel only using the power of the motor generator 82. In the second mode, the controller 100 causes the internal combustion engine 10 to run and sets the clutch 81 to the connected state. In this case, the controller 100 causes the vehicle 90 to travel using the power of the internal combustion engine 10 and the power of the motor generator 82 in combination. In the second mode, the controller 100 may cause the vehicle 90 to travel only using the power of the internal combustion engine 10 through regenerative power generation of the motor generator 82.

For example, in a case in which the battery 79 has a sufficient remaining battery level, the controller 100 selects the first mode when the accelerator operation amount ACC is relatively small and selects the second mode when the accelerator operation amount ACC is relatively large. That is, the controller 100 switches the traveling mode in correspondence with the accelerator operation amount ACC. For example, in the case of switching the traveling mode to the second mode, when the accelerator operation amount ACC increases to a specified operation amount, the controller 100 determines that a request for switching to the second mode has been made; that is, determines that a start request for the internal combustion engine 10 has been made. Then, the controller 100 performs processes needed for switching the traveling mode.

The specified operation amount is a value defined as follows. The torque that should be output by the vehicle 90 to the accelerator operation amount ACC instructed by an occupant is referred to as a vehicle shaft torque. To operate the internal combustion engine 10, the internal combustion engine 10 needs to be operated with a relatively high combustion efficiency to improve fuel economy. When the internal combustion engine 10 is operated with a relatively high combustion efficiency, the torque of the internal combustion engine 10 is thus relatively large. Accordingly, operating the internal combustion engine 10 when the vehicle shaft torque is relatively small is not preferred in terms of fuel economy. Thus, it is preferred that when the vehicle shaft torque is relatively small, the vehicle shaft torque is produced only by the motor generator 82 without operating the internal combustion engine 10. The specified operation amount is, for example, an accelerator operation amount ACC corresponding to the minimum value of the vehicle shaft torque that allows the internal combustion engine 10 to run with a relatively high combustion efficiency.

Unassisted Start Control

After the controller 100 switches the traveling mode of the vehicle 90 from the second mode to the first mode, the request for switching the traveling mode to the second mode may be made immediately. This corresponds to a situation in which after the occupant depresses the accelerator pedal 94 and then temporarily releases the accelerator pedal 94, the occupant depresses the accelerator pedal 94 again in order to instruct the vehicle 90 to accelerate again (hereinafter referred to as a re-request situation). As described above, when the traveling mode is the first mode, the controller 100 sets the clutch 81 to the disconnected state and causes the internal combustion engine 10 to stop. That is, in the re-request situation, the request for switching the traveling mode to the second mode (i.e., the start request for the internal combustion engine 10) is made in a state in which the clutch 81 is disconnected and ignition by the ignition plugs 19 and fuel injection by the injectors are stopped.

The time at which the occupant instructs the vehicle 90 to accelerate again after releasing the accelerator pedal 94 may be relatively early in the re-request situation. In such a case, when the vehicle 90 is instructed to accelerate again (i.e., when the start request for the internal combustion engine 10 is made), the crankshaft 14 has not stopped yet and is rotating by inertia. The controller 100 executes an unassisted start control when the engine rotation speed NE obtained when the start request for the internal combustion engine 10 was made is greater than or equal to a first specified rotation speed and less than a second specified rotation speed. The unassisted start control is performed to restart the internal combustion engine 10 only using the torque of the internal combustion engine 10, without using the assistance of torque by the motor generator 82. When the controller 100 executes the unassisted start control, the rotation speed of the crankshaft 14 (i.e., the engine rotation speed NE) increases to the second specified rotation speed or higher. After executing the unassisted start control, the controller 100 sets the clutch 81 to the connected state.

The first specified rotation speed is predefined through, for example, experiments or simulations as the minimum value of the engine rotation speed NE that allows the internal combustion engine 10 to be started without the assistance by the motor generator 82. The second specified rotation speed is the minimum engine rotation speed NE that allows the internal combustion engine 10 to run independently. That is, the second specified rotation speed is an idle rotation speed.

In the unassisted start control, the controller 100 executes combustion of air-fuel mixture corresponding to a predefined number of times (e.g., two cycles of the internal combustion engine 10). During the combustion, the controller 100 performs fuel injection and ignition in the following manner. In the unassisted start control, the internal combustion engine 10 needs to produce a relatively large torque. To increase the torque of the internal combustion engine 10, hastening the ignition timings of the ignition plugs 19 is effective. Thus, in the unassisted start control, the controller 100 performs ignition for a cylinder 11 subject to ignition as early as possible subsequent to the compression top dead center. Further, in the unassisted start control, the controller 100 causes the direct injector 18 to inject fuel. For example, the injection timing of fuel is preferably as close as possible to the ignition timing in order to avoid preignition, in which fuel burns spontaneously. For this reason, the controller 100 causes the direct injector 18 to inject fuel at a time which is as close as possible to the compression top dead center and at which a requested injection amount can be fully injected prior to ignition by the ignition plug 19 in the compression stroke of a cylinder 11 subject to ignition. The requested injection amount in the unassisted start control becomes larger as the engine rotation speed NE becomes higher. This is because the amount of intake air becomes larger as the engine rotation speed NE becomes higher. That is, the air-fuel mixture in the cylinder 11 is intended to be burned at an air-fuel ratio closer to the stoichiometric air-fuel ratio. Since the torque of the internal combustion engine 10 needs to be increased, the requested injection amount is set such that the air-fuel ratio in the cylinder 11 is richer than the stoichiometric air-fuel ratio.

Summary of Initial Injection Control

The controller 100 is capable of executing an initial injection control as part of the unassisted start control. In the unassisted start control, the initial injection control is related to injecting fuel to a cylinder in which first combustion is caused (hereinafter referred to as a first combustion cylinder). The first combustion refers to burning air-fuel mixture for the first time since the start request for the internal combustion engine 10 was made.

In the initial injection control, the controller 100 executes a first process, a second process, a third process, and a fourth process.

In the first process, the controller 100 identifies a target cylinder. The target cylinder refers to a cylinder 11 that is in the compression stroke when the start request for the internal combustion engine 10 is made. The direct injector 18 that injects fuel into the target cylinder is hereinafter referred to as a target injector.

Figure 3:
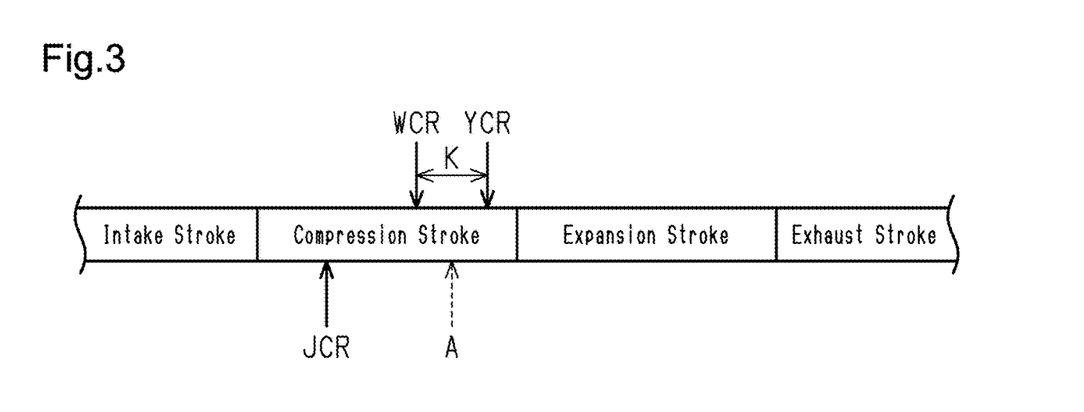
FIG. 3 is a schematic diagram illustrating an example of the relationship between the determination position, the start crank position, and the requested injection position in the internal combustion engine shown in FIG. 2.

In the second process, the controller 100 calculates a requested injection position YCR as shown in FIG. 3. The requested injection position YCR is a crank position at which fuel injection should be started by the target injector if air-fuel mixture is burned in the target cylinder. The controller 100 stores an injection map in advance as information necessary for calculation of the requested injection position YCR. The injection map represents the relationship between the engine rotation speed NE, the fuel pressure P, and a set rotation amount. The set rotation amount represents, by the rotation amount of the crankshaft 14, the length of a period during which the direct injector 18 fully injects the requested injection amount. The rotation amount of the crankshaft 14 represents the rotation angle of the crankshaft 14 obtained when the crankshaft 14 rotates from a rotation position to another rotation position. As described above, the requested injection amount becomes larger as the engine rotation speed NE becomes higher. For this reason, at the same fuel pressure P, the set rotation amount becomes larger as the engine rotation speed NE becomes higher in the injection map. At the same engine rotation speed NE, the set rotation amount becomes smaller as the fuel pressure P becomes higher in the injection map. This reflects the fact that as the fuel pressure P becomes higher, the amount of fuel that can be injected from the direct injector 18 per unit time becomes larger. The injection map is created based on, for example, experiments or simulations. The method for calculating the requested injection position YCR will be described in detail later.

Figure 4:
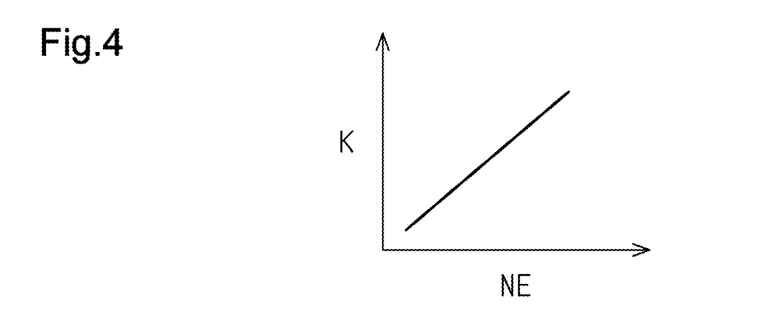
FIG. 4 is a graph illustrating an example of a specified map.

In the third process, the controller 100 calculates a start injection position WCR. As shown in FIG. 3, the start injection position WCR is a crank position advanced from the requested injection position YCR by a specified rotation amount K. Advancing means moving the crank position backward from a certain point. Retardation is opposite to advancement. The length of a period from when the controller 100 outputs the command signal Z to instruct the direct injector 18 to inject fuel to when the direct injector 18 actually starts injecting fuel is referred to as a necessary period. The specified rotation amount K represents the necessary period by the rotation amount of the crankshaft 14. In FIG. 3, the specified rotation amount K is shown in an exaggerated manner. The controller 100 stores a specified map in advance as information used to calculate the specified rotation amount K, which is necessary for calculation of the start injection position WCR. As shown in FIG. 4, the specified map represents the relationship between the engine rotation speed NE and the specified rotation amount K. The necessary period, in which time is used as a scale, is substantially fixed regardless of the engine rotation speed NE. The rotation amount of the crankshaft 14 obtained during the passage of a certain time becomes larger as the engine rotation speed NE becomes higher. Thus, the specified rotation amount K becomes larger as the engine rotation speed NE becomes higher. The specified map is created based on, for example, experiments or simulations.

In the fourth process, the controller 100 causes the target injector to inject fuel only in a case in which a crank position JCR obtained when the start request for the internal combustion engine 10 (hereinafter referred to as a determination position JCR) was made is located at a crank position advanced from the start injection position WCR. That is, the controller 100 outputs the command signal Z to instruct the target injector to inject fuel at the start injection position WCR.

Specific Processes of Initial Injection Control

Upon the start request for the internal combustion engine 10 in the re-request situation, the controller 100 quickly starts the unassisted start control on condition that the engine rotation speed NE is greater than or equal to a first given rotation speed and less than a second given rotation speed. After starting the unassisted start control, the controller 100 starts the initial injection control, which is part of the initial injection control.

Figure 5:
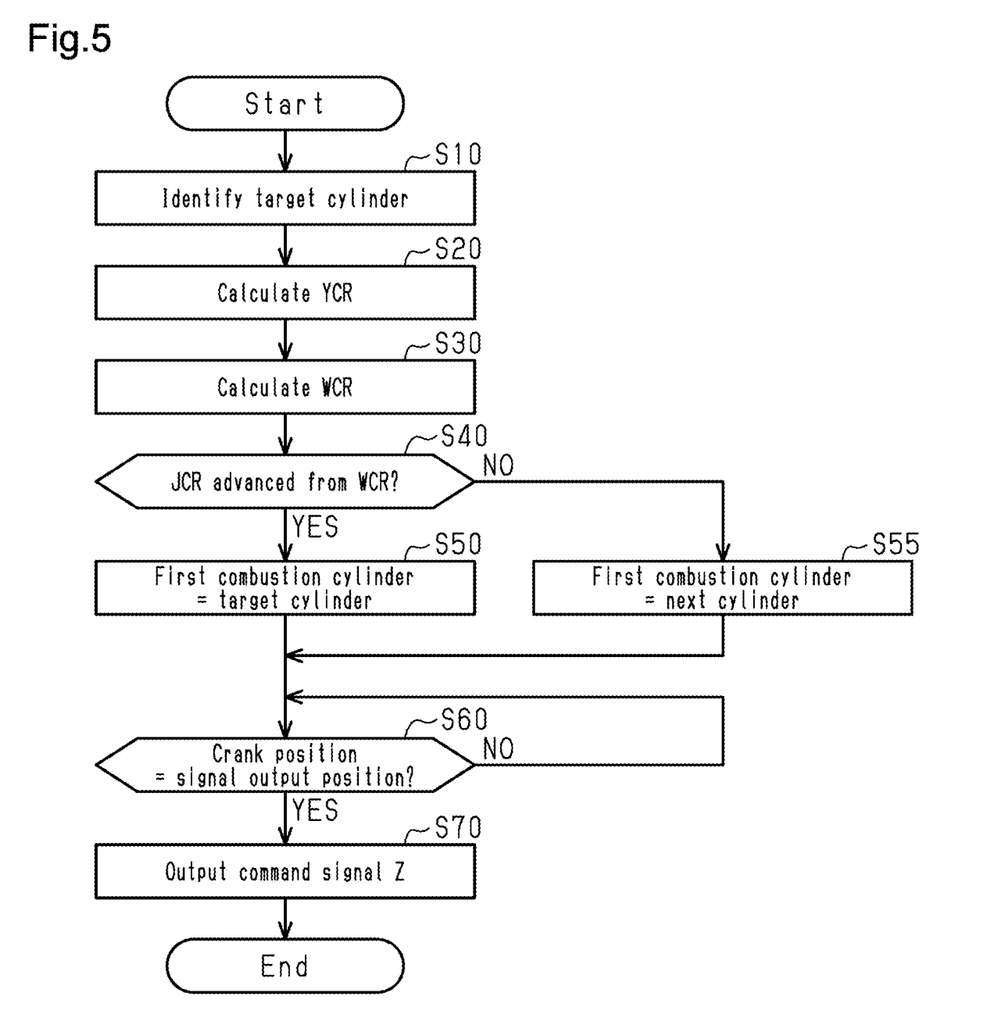
FIG. 5 is a flowchart illustrating a procedure for an initial injection control executed by the controller in FIG. 1.

As shown in FIG. 5, after starting the initial injection control, the controller 100 first executes the process of step S10. In step S10, the controller 100 identifies the target cylinder, which is a cylinder 11 that is currently in the compression stroke, from the four cylinders 11. As described above, the controller 100 constantly obtains the phase of each cylinder 11. Based on this information, the controller 100 identifies the target cylinder. After identifying the target cylinder, the controller 100 advances the process to step S20. The process of step S10 corresponds to the first process.

In step S20, the controller 100 calculates the requested injection position YCR for the target injector. To calculate the requested injection position YCR, the controller 100 first calculates the set rotation amount. Specifically, the controller 100 refers to the latest engine rotation speed NE and the latest fuel pressure P. Further, the controller 100 refers to the injection map. Then, the controller 100 calculates the set rotation amount corresponding to the latest engine rotation speed NE and the latest fuel pressure P in the injection map. In addition, the controller 100 obtains the crank position that will be obtained when the target cylinder reaches the compression top dead center later. From the crank position that will be obtained when the target cylinder reaches the compression top dead center, the controller 100 calculates, as the requested injection position YCR, a crank position advanced by the set rotation amount. After calculating the requested injection position YCR, the controller 100 advances the process to step S30. The process of step S20 corresponds to the second process. The controller 100 executes the process of step S20 immediately after the start request for the internal combustion engine 10 was made. Thus, the controller 100 treats the engine rotation speed NE referred to in step S20 as the engine rotation speed NE obtained when the start request for the internal combustion engine 10 was made. The same applies to the fuel pressure P.

In step S30, the controller 100 calculates the start injection position WCR. To calculate the start injection position WCR, the controller 100 first calculates the specified rotation amount K. Specifically, the controller 100 refers to the specified map shown in FIG. 4. In the specified map, the controller 100 calculates the specified rotation amount K that corresponds to the engine rotation speed NE that was referred to in step S20. After calculating the specified rotation amount K, the controller 100 calculates, as the start crank position WCR, a crank position advanced from the requested injection position YCR by the specified rotation amount K. After calculating the start injection position WCR, the controller 100 advances the process to step S40. The process of step S30 corresponds to the third process.

In step S40, the controller 100 determines whether the current crank position is a crank position advanced from the start injection position WCR. To perform the determination, the controller 100 refers to the latest crank position and the start injection position WCR that was calculated in step S30. In the same manner as the engine rotation speed NE described in step S20, the controller 100 treats the crank position referred to in step S40 as the crank position obtained when the start request for the internal combustion engine 10 was made; that is, as the determination position JCR. When the determination position JCR is the crank position advanced from the start injection position WCR (step S40: YES), the controller 100 advances the process to step S50. In this case, in step S50, the controller 100 selects the target cylinder as the first combustion cylinder from the four cylinders 11. Then, the controller 100 determines the start injection position WCR calculated in step S30 as a signal output position. Subsequently, the controller 100 advances the process to step S60.

When the determination position JCR is the crank position retarded from the start injection position WCR in step S40 (step S40: NO), the controller 100 advances the process to step S55. Likewise, when the determination position JCR matches the start injection position WCR, the controller 100 advances the process to step S55. In these cases, in step S55, the controller 100 selects, as the first combustion cylinder, the cylinder 11 that will enter the compression stroke subsequent to the target cylinder from the four cylinders 11. Then, the controller 100 determines, as the signal output position, a crank position retarded from the start injection position WCR by 180°. Subsequently, the controller 100 advances the process to step S60.

In step S60, the controller 100 compares the latest crank position with the signal output position calculated in step S50 or S55. When the latest crank position does not match the signal output position (step S60: NO), the controller 100 performs the process of step S60 again. The controller 100 repeats the process of step S60 until the latest crank position matches the signal output position. When the latest crank position matches the signal output position (step S60: YES), the controller 100 advances the process to step S70.

In step S70, the controller 100 outputs the command signal Z to instruct the direct injector 18 corresponding to the cylinder 11 selected as the first combustion cylinder to inject fuel. Subsequently, the controller 100 stops outputting the command signal Z at a proper crank position at which the injection of fuel by the requested injection amount is completed. Then, the controller 100 ends a series of processes of the initial injection control. The processes of step S40, S50, S55, S60, and S70 correspond to the fourth process. After ending the initial injection control, the controller 100 starts controls other than the unassisted start control. These controls include an ignition control, control for the second and subsequent fuel injection, and the like.

Operation of Embodiment

From when the controller 100 outputs the command signal Z to instruct the direct injector 18 to inject fuel to when the direct injector 18 actually starts injecting fuel, the following series of processes takes place. First, the drive circuit 73 is activated. For example, a switch included in the drive circuit 73 is turned on. Then, current starts to be supplied to the electromagnetic solenoid 18A. Next, the value of the current flowing through the electromagnetic solenoid 18A gradually increases. After the current value increases to a certain extent, the valve member 18B moves to the injection position. Subsequently, the direct injector 18 starts injecting fuel. The series of processes take place over a relatively long period of time. In a condition in which the crankshaft 14 is rotating when the controller 100 outputs the command signal Z to the direct injector 18, the crankshaft 14 continues to rotate during the series of processes. The specified rotation amount K is the rotation amount of the crankshaft 14 during the series of processes. The start injection position WCR is set to a crank position with the specified rotation amount K taken into account. That is, as shown in FIG. 3, the start injection position WCR is a crank position advanced from the requested injection position YCR by the specified rotation amount K. Accordingly, as long as the controller 100 can output the command signal Z at the start injection position WCR, the delay from when the controller 100 outputs the command signal Z to when the target injector starts injecting fuel can be offset by the period during which the crankshaft 14 is rotating by the specified rotation amount K. This allows the target injector to start injecting fuel at the requested injection position YCR. As long as fuel injection can be started at the requested injection position YCR, the target injector can finish injecting fuel prior to ignition.

Thus, the controller 100 outputs the command signal Z at the start injection position WCR in a case in which the determination position JCR, which is the crank position obtained when the start request for the internal combustion engine 10 was made, is advanced from the start injection position WCR as shown in the example of FIG. 3. The controller 100 postpones outputting the command signal Z to the target injector in a case in which the determination position JCR is retarded from the start injection position WCR as shown by the dotted line of FIG. 3. In this case, first combustion is caused in the cylinder 11 that will enter the compression stroke subsequent to the target cylinder.

Advantages of Embodiment

As described in the section titled Operation of Embodiment, in a case in which the controller 100 can output a signal to the target injector earlier than a time at which the signal needs to be output so that fuel injection is completed prior to ignition, the controller 100 outputs the command signal Z to the target injector to cause the target injector to inject fuel. In this case, the controller 100 can cause first combustion as early as possible after the start request for the internal combustion engine 10 is made. This allows the internal combustion engine 10 to be started quickly. In a case in which the controller 100 cannot output a signal to the target injector earlier than the above time, the controller 100 cancels fuel injection by the target injector without outputting the command signal Z to the target injector. This avoids situations in which the target injector injects more fuel than necessary.

The above necessary period, from when the controller 100 outputs the command signal Z to the direct injector 18 to when the direct injector 18 actually starts injecting fuel, is substantially the same regardless of the engine rotation speed NE. As described above, even if the necessary period related to time is the same, the specified rotation amount K, which is the rotation amount of the crankshaft 14, is different when the engine rotation speed NE is different. In the present embodiment, such a difference in the specified rotation amount K corresponding to the engine rotation speed NE is reflected on the calculation of the start injection position WCR. This makes the start injection position WCR accurate.

Modifications

The above embodiment may be modified as follows. The above embodiment and the following modifications can be combined as long as the combined modifications remain technically consistent with each other.

The specified rotation amount K does not have to be the rotation amount of the crankshaft 14 corresponding to the necessary period. For example, the specified rotation amount K may be the rotation amount of the crankshaft 14 corresponding to a period that is shorter than the necessary period. In addition, the specified rotation amount K does not have to become larger in correspondence with the engine rotation speed NE. Instead, the specified rotation amount K may be a fixed value regardless of whether the engine rotation speed NE is relatively large or small. The specified rotation amount K may be set to any value as long as the rotation amount of the crankshaft 14 is set so as to offset, to some extent, the delay from when the controller 100 outputs the command signal Z to when the direct injector 18 starts injecting fuel.

The requested injection position YCR does not have to be defined in the manner of the embodiment. The requested injection position YCR may be a crank position advanced from the ignition timing by the set rotation amount. In addition, the set rotation amount used to calculate the requested injection position YCR does not necessarily have to be the rotation amount of the crankshaft 14 that corresponds to the requested injection amount by which injection is performed. The set rotation amount may be defined as a value in which another element (e.g., exhaust emission) is taken into account, in addition to the period for the requested injection amount to be fully injected. The controller 100 may calculate the requested injection position YCR without using the set rotation amount. For example, a map that defines the relationship between the engine rotation speed NE, the fuel pressure P, and the requested injection position YCR may be created in advance. The controller 100 may directly calculate the requested injection position YCR from the map. If it is already clear that the fuel pressure P used to perform the unassisted start control is defined as a value that is unique to a certain extent, the map may define only the relationship between the engine rotation speed NE and the requested injection position YCR. The requested injection position YCR only needs to be calculated based on the engine rotation speed NE.

In a case in which the controller 100 postpones fuel injection by the target injector and then causes fuel injection to be performed in the cylinder 11 that will subsequently enter the compression stroke, the crank position at which the controller 100 outputs the command signal Z to the direct injector 18 of that cylinder 11 is not limited to the example of the above embodiment. That is, an additional proper crank position may be set instead of setting the above crank position to a crank position retarded from the start injection position WCR by 180°.

The range of the engine rotation speed NE, which serves as a condition for starting the unassisted start control, is not limited to the example of the above embodiment. That is, the first given rotation speed and the second given rotation speed are not limited to the examples of the above embodiment. The first given rotation speed only needs to be greater than 0. The controller 100 only needs to define the requested injection amount, the injection timing, the ignition timing, and the like in correspondence with the engine rotation speed NE obtained when the start request for the internal combustion engine 10 was made, so that the controller 100 can start the internal combustion engine 10 by performing the unassisted start control without the assistance of the motor generator 82.

The specified operation amount, which serves as a threshold value used to switch the traveling mode from the first mode to the second mode, does not have to be defined using the method of the above embodiment. The specified operation amount only needs to be a value that allows the traveling mode to be switched in a proper condition in view of the fuel economy and electricity economy of the vehicle 90.

The configuration of the internal combustion engine 10 is not limited to the example of the above embodiment. For example, the number of the cylinders 11 may be changed. The internal combustion engine 10 only needs to include multiple cylinders 11, direct injectors 18 respectively disposed in the cylinders 11, and the crankshaft 14.

The configuration of each direct injector 18 is not limited to the example of the above embodiment. Instead of the electromagnetic solenoid 18A, the direct injector 18 may include, for example, a piezoelectric element that expands and shrinks when voltage is applied. Even in this case, there is a delay from when the controller 100 outputs the command signal Z to instruct fuel to be injected to when the valve member 18B is operated to actually start injecting fuel. The specified rotation amount K that is necessary for offsetting this delay needs to be set.

The configuration of the sensor plate 167 is not limited to the example of the above embodiment. The position of the tooth-missing portion 169 does not have to be defined using the manner of the above embodiment. For example, the position of the tooth-missing portion 169 may be defined such that the crank position sensor 61 faces the tooth-missing portion 169 before and after the piston 12 of the second cylinder #2 reaches the compression top dead center. In addition, the teeth 168 of the sensor plate 167 do not have to be arranged in the manner of the embodiment. The sensor plate 167 only needs to be arranged such that the crank position and the phase of each cylinder 11 are identifiable.

In the same manner as the sensor plate 167, the configuration of the first rotor plate 31 is not limited to the example of the above embodiment. The first rotor plate 31 only needs to be arranged such that the rotation position of the intake camshaft 25 and the phases of the cylinders 11 can be obtained. The same applies to the second rotor plate.

The method for identifying the phase of each cylinder 11 is not limited to the example of the above embodiment. The method for identifying the phase of the cylinder 11 varies depending on the configurations of the sensor plate 167, the first rotor plate 31, and the second rotor plate. Any method may be employed as long as the phase of the cylinder 11 can be properly identified. The controller 100 only needs to identify the phase of the cylinder 11 by combining information that can be obtained from changes in the rotation of the sensor plate 167, changes in the rotation of the first rotor plate 31, and changes in the rotation of the second rotor plate.

The configuration of the vehicle 90 is not limited to the example of the above embodiment. In the vehicle 90, the motor generator 82 only needs to be located on the power transmission path from the internal combustion engine 10 to the driven wheels 72. Further, the clutch 81, which connects and disconnects the internal combustion engine 10 and the motor generator 82, only needs to be located between the internal combustion engine 10 and the motor generator 82.

The multi-speed automatic transmission 85 may be replaced with, for example, a continuously variable transmission may be employed.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

The invention claimed is:

1. A controller for a vehicle, the vehicle including:
   an internal combustion engine that includes
      cylinders,
      injectors respectively disposed in the cylinders and each configured to directly inject fuel into a corresponding one of the cylinders, and
      a crankshaft;
   an electric motor located on a power transmission path from the internal combustion engine to a driven wheel, the electric motor including a rotary shaft; and
   a clutch located between the internal combustion engine and the electric motor, the clutch being configured to switch between a connected state in which the crankshaft and the rotary shaft are connected to each other and a disconnected state in which the crankshaft and the rotary shaft are disconnected from each other,
   the controller comprising processing circuitry, wherein the processing circuitry is configured to execute:
   when a start request for the internal combustion engine is made in a state in which 1) the clutch is in the disconnected state, 2) a rotation speed of the crankshaft is greater than or equal to a specified rotation speed that is greater than zero, and 3) fuel injection by the injector is stopped,
      a first process that identifies a target cylinder from the cylinders, the target cylinder referring to a cylinder that is in a compression stroke when the start request is made;
      a second process that calculates a requested injection position based on the rotation speed of the crankshaft, the requested injection position referring to a rotation position of the crankshaft at which fuel injection should be started by a target injector if fuel is burned in the target cylinder, and the target injector referring to an injector configured to inject fuel into the target cylinder;
      a third process that calculates, as a start crank position, the rotation position of the crankshaft that is advanced from the requested injection position by a specified rotation amount; and
      a fourth process that outputs a command signal that instructs the target injector to inject fuel at the start crank position only in a case in which the rotation position of the crankshaft obtained when the start request was made is advanced from the start crank position.

2. The controller according to claim 1, wherein the specified rotation amount becomes larger as the rotation speed of the crankshaft becomes higher.

3. The controller according to claim 1, wherein in a case in which the rotation position of the crankshaft obtained when the start request was made is not advanced from the start crank position, the processing circuitry is configured to output a command signal that instructs an injector corresponding to a cylinder that will enter a compression stroke subsequent to the target cylinder to inject fuel at a predetermined crank position that is retarded from the start crank position.

4. A control method for a vehicle, the vehicle including:
   an internal combustion engine that includes
      cylinders,
      injectors respectively disposed in the cylinders and each configured to directly inject fuel into a corresponding one of the cylinders, and
      a crankshaft;
   an electric motor located on a power transmission path from the internal combustion engine to a driven wheel, the electric motor including a rotary shaft; and
   a clutch located between the internal combustion engine and the electric motor, the clutch being configured to switch between a connected state in which the crankshaft and the rotary shaft are connected to each other and a disconnected state in which the crankshaft and the rotary shaft are disconnected from each other,
   the control method comprising:
   when a start request for the internal combustion engine is made in a state in which 1) the clutch is in the disconnected state, 2) a rotation speed of the crankshaft is greater than or equal to a specified rotation speed that is greater than zero, and 3) fuel injection by the injector is stopped,
      identifying a target cylinder from the cylinders, the target cylinder referring to a cylinder that is in a compression stroke when the start request is made;
      calculating a requested injection position based on the rotation speed of the crankshaft, the requested injection position referring to a rotation position of the crankshaft at which fuel injection should be started by a target injector if fuel is burned in the target cylinder, and the target injector referring to an injector configured to inject fuel into the target cylinder;
      calculating, as a start crank position, the rotation position of the crankshaft that is advanced from the requested injection position by a specified rotation amount; and
      outputting a command signal that instructs the target injector to inject fuel at the start crank position only in a case in which the rotation position of the crankshaft obtained when the start request was made is advanced from the start crank position.

* * * * *